United States Patent [19]

McFarland

[11] 4,076,297
[45] Feb. 28, 1978

[54] DEVICE FOR HANDLING CAKE LAYERS

[76] Inventor: Paula M. McFarland, 534 N. Grand W., Springfield, Ill. 62702

[21] Appl. No.: 716,226

[22] Filed: Aug. 20, 1976

[51] Int. Cl.² .................................................. A47J 43/28
[52] U.S. Cl. .......................................... 294/7; 294/32; D7/103
[58] Field of Search ................... 294/7, 32, 92; D7/83, D7/99, 102, 103; 99/394; 118/500; 269/53, 32 W, 54.5

[56] References Cited

U.S. PATENT DOCUMENTS

| D. 224,037 | 6/1972 | Demetron | D7/103 |
|---|---|---|---|
| 2,034,238 | 3/1936 | Karalis | 294/32 |
| 2,635,528 | 4/1953 | Torres | D7/103 |

Primary Examiner—James B. Marbert
Attorney, Agent, or Firm—Ralph F. Staubly

[57] ABSTRACT

A device for handling fragile layers of baked goods comprises a plurality of smooth rods (e.g. of stainless steel) rigidly fixed to a bridging handle so as to extend parallelly and coplanarly therefrom. A second handle is provided with transverse parallel bores for removably engaging the free ends of said rods. The layer support so provided can be laid face-down over a cake layer in its bake pan and can be manually held against the layer and the pan while they and the support are inverted to permit the inverted pan to be lifted off the layer. The thus supported layer can then be accurately laid on any flat surface, such as a platter or an icing-coated previously handled layer. Finally, after the removable handle has been detached, the parallel rods can be axially withdrawn from beneath their supported layer, or from between two superposed layers, with minimal disturbance of the surface or surfaces engaged by said rods.

9 Claims, 6 Drawing Figures

U.S. Patent  Feb. 28, 1978  4,076,297
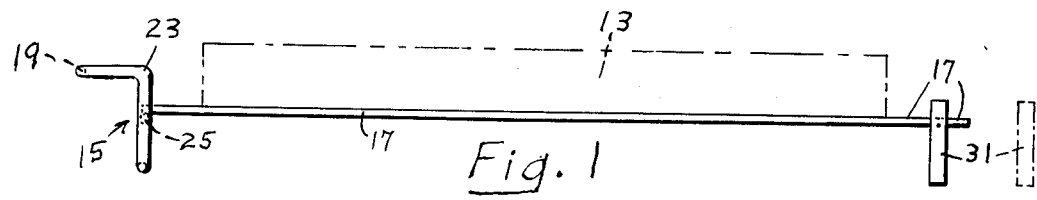
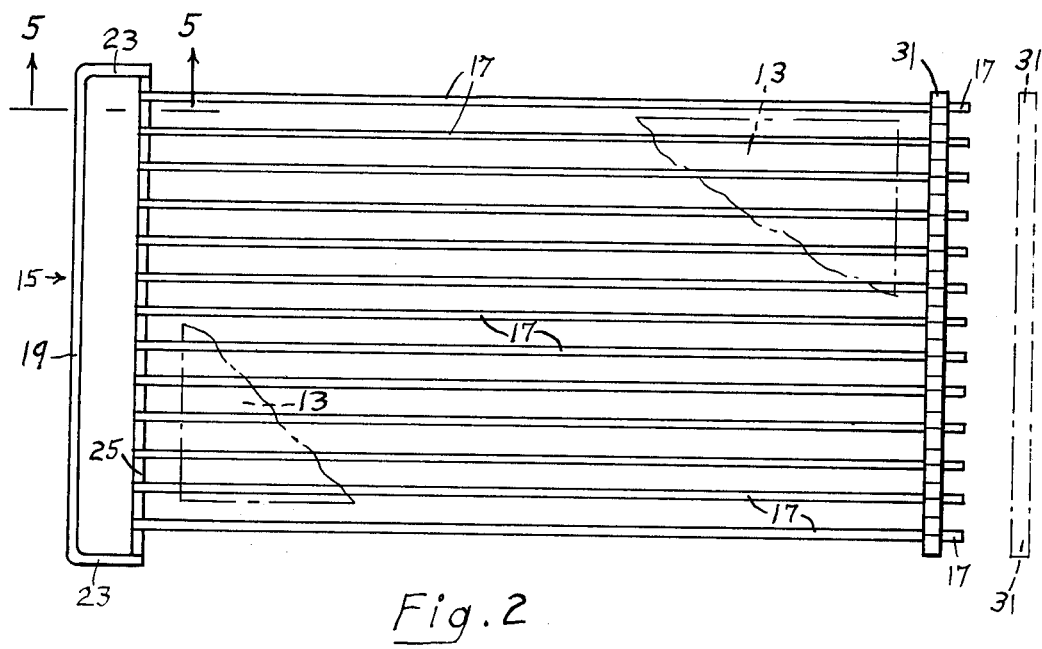
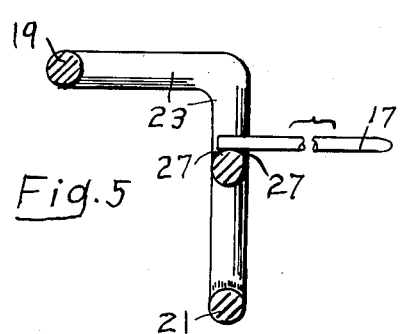
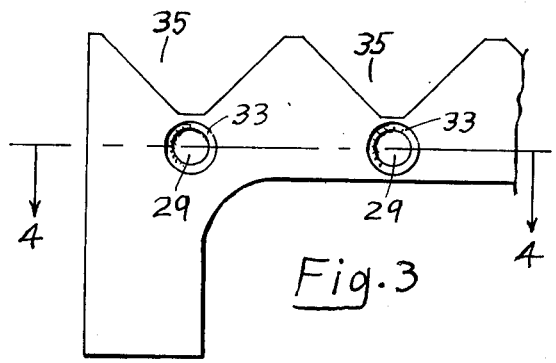
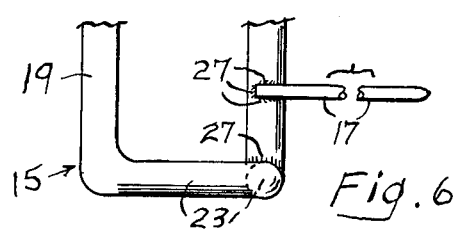
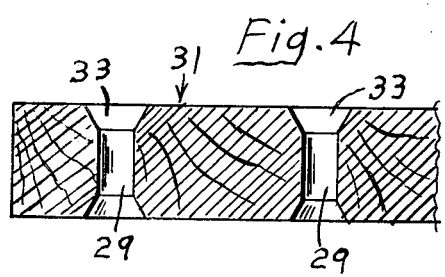

DEVICE FOR HANDLING CAKE LAYERS

BACKGROUND AND OBJECTS OF THE INVENTION

Due to their fragility, cake layers, especially large ones, are difficult to handle without breakage and are difficult to set accurately on a previously positioned and iced layer. A large fork-type baker's peel (e.g. like that of Fichett U.S. Pat. No. 843,333) could be employed to place a layer on a previously iced layer, but it could then not be withdrawn without damage to the icing interlayer. It is accordingly the object of the present invention to provide a device for handling cake layers (especially large ones) when making iced layer-cakes, which device is highly effective, is easy to use and clean, and is of simple, sturdy and economical construction.

BRIEF DESCRIPTION OF THE DRAWINGS

FIG. 1 is a side elvational view of a preferred embodiment of the invention.

FIG. 2 is a plan view of the showing of FIG. 1.

FIG. 3 is an enlarged fragmentary end elevational view of the removable handle.

FIG. 4 is a plan view of the showing of FIG. 3, in section taken to the line 4—4 of FIG. 3.

FIG. 5 is an enlarged fragmentary sectional view taken on the line 5—5 of FIG. 2.

FIG. 6 is an enlarged fragmentary plan view of the lower left corner of FIG. 2.

DETAILED DESCRIPTION

With reference now to the drawings, the numeral 11 generally designates the device for handling a cake layer 13 (shown in phantom in FIGS. 1 and 2). The device 11 comprises a first handle 15 to which a plurality of parallel coplanar relatively thin rods or tines 17 (e.g. of stainless steel) are fixed, as by welding if the handle is made of heavier metal rods, as shown. However, it should be noted that the fixing of the tines to this handle need not be absolutely permanent, but could be semi-permanent, as by the use of threaded or frictionally holding sockets.

The handle 15 is disclosed as formed of one or more stainless-steel rods bent and welded into a closed figure having an upper hand-grip reach 19 and a table-engaging support reach 21 interconnected by a pair of inverted L-shaped reaches 23. A tine-supporting horizontally disposed rod 25 is shown butt-welded at its ends medially of the vertical reaches of the L-shaped handle portions 23. The tines 17 are welded or brazed at their fixed ends to their anchoring rods 21 by added metal 27.

The free ends of the parallel and coplanar tines 17 are receivable into equivalently spaced sockets 29 in a tine-bridging removable handle 31 (FIGS. 3 and 4), herein shown as made of wood, but which obviously could be made of alloys and plastics if desired. The sockets 29 preferably have flared mouths 33 at their ends to facilitate insertion of the tines 17 during use of the device. The removable handle 31 may also have notches 35 in its upper surface to hold the tines properly spaced (against being bent) while being cleaned after use.

What is claimed as being new and patentable is:

1. A device for handling cake layers or the like, comprising: a first handle, at least six parallel and coplanar tines rigidly and freely so held by said first handle, and a second removable handle bridging the free ends of said tines, said second handle having spaced sockets alignable with, and for quickly and easily receiving and releasing, said free ends.

2. Structure according to claim 1, said sockets having tapered bores at their ends to facilitate insertion of said free ends into said sockets.

3. Structure according to claim 1, said second handle having notches in its upper surface spaced to hold said tines in parallel and coplanar array for cleaning or storage of said device.

4. Structure according to claim 1, said tines being of stainless steel.

5. Structure according to claim 1, said first handle being formed of three vertically and horizontally spaced parallel bars interconnected by inverted L-shaped rod elements, the outer and uppermost bar constituting a handgrip, the lowermost bar constituting a table-engaging support element, and the intermediate bar constituting the tine-holding means.

6. Structure according to claim 5, at least the intermediate bar being of stainless steel and said tines being welded thereto.

7. Structure according to claim 1, said second handle comprising a bar provided with horizontal parallel sockets for removably receiving the free ends of said tines to hold them in coplanar parallel array during layer-handling use, but removable to permit parallel withdrawal of said tines after final placement of handled layers.

8. Structure according to claim 7, said bar of said second handle having notches in its upper surface spaced equivalently to said tines whereby said tines can be supported in proper array after use for protection and/or for cleaning, and to prevent socket clogging by crumbs or icing.

9. Structure according to claim 7, said sockets extending at least partway through said second handle and having outwardly flared mouths to facilitate insertion of the free ends of said tines into said sockets.